United States Patent [19]

Okabe

[11] 3,795,812
[45] Mar. 5, 1974

[54] SULFUR DIOXIDE POLLUTION MONITOR
[75] Inventor: Hideo Okabe, Rockville, Md.
[73] Assignee: The United States of America as represented by the Secretary of Commerce, Washington, D.C.
[22] Filed: Nov. 27, 1972
[21] Appl. No.: 309,868

[52] U.S. Cl................................ 250/373, 250/461
[51] Int. Cl............................................ G01n 21/26
[58] Field of Search................... 250/372, 373, 461

[56] References Cited
UNITED STATES PATENTS
3,032,654  5/1962  Fay et al............................ 250/373
3,430,041  2/1969  Kaye................................. 250/373

Primary Examiner—Archie R. Borchelt
Attorney, Agent, or Firm—David Robbins; Alvin J. Englert

[57] ABSTRACT

A sample stream of air, smokestack gas or the like is flowed through a fluorescence cell where it is irradiated with ultraviolet in the region from about 2100 to 2300 A. The intensity of the resulting $SO_2$ fluorescence in the region from about 2400 to 4200 A is measured at right angles to the incident beam. The response to various $SO_2$ concentrations is linear over wide ranges and is negligibly or moderately affected by the presence of water vapor in the sample stream.

10 Claims, 5 Drawing Figures

PATENTED MAR 5 1974 3,795,812
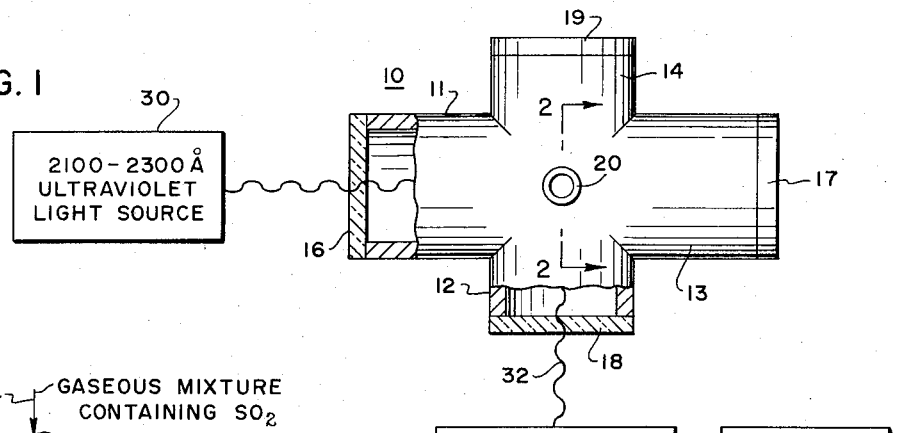
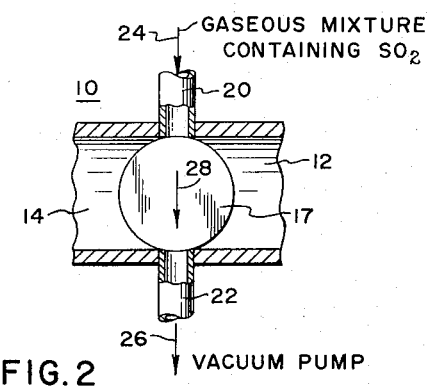
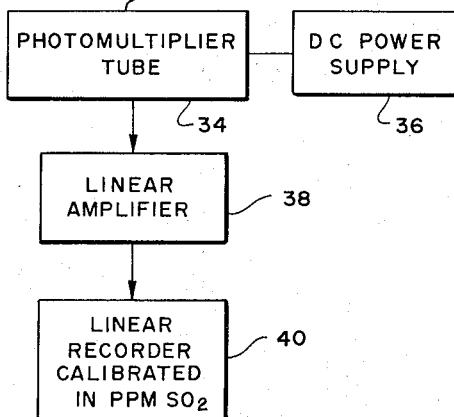
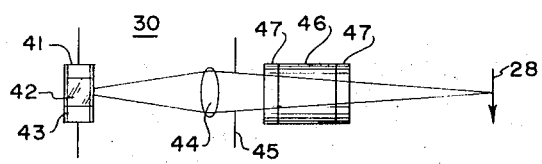
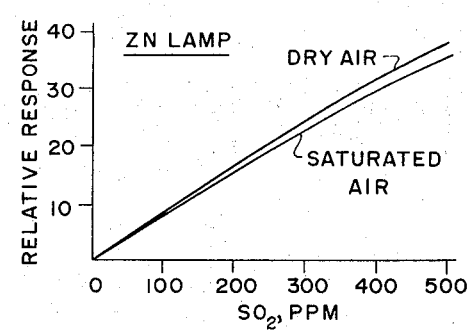
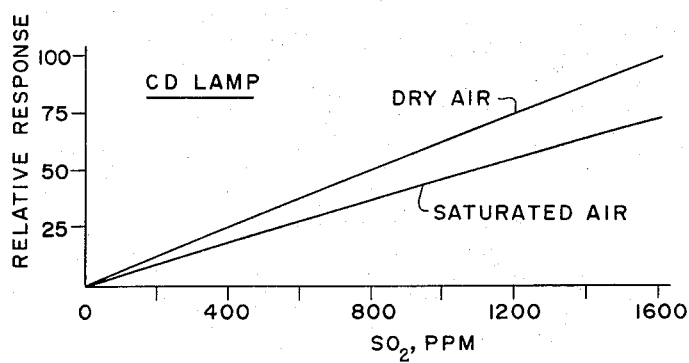

SULFUR DIOXIDE POLLUTION MONITOR

BACKGROUND OF THE INVENTION

About 80 million tons of sulfur dioxide are currently released into the air each year by the burning of sulfur-containing coal and oil and the refining of oil and various metals. Since $SO_2$ concentrations of a few parts per million (ppm) of air can cause breathing difficulties, kill plants and hasten the deterioration of papers, leathers and limestone building materials, it has been proposed to limit the concentration of $SO_2$ in stack gases to a maximum of 500 ppm. One state (California) has enacted a law to this effect.

Prior $SO_2$ monitoring devices typically are colorimetric or flame-photometric instruments. Colorimetric instruments bubble the air or stack gas through a solution consisting of a dye (p-rosaniline), hydrochloric acid and formaldehyde. The solution turns red-violet in the presence of $SO_2$. The disadvantages of this type of instrument are that it requires frequent and time-consuming attention and the periodic preparation of fresh solution. Flame-photometric instruments pass the air or gas through a hydrogen-air flame and measure the resulting sulfur emission bands. These instruments require a supply of hydrogen gas and in addition require the use of a gas chromatograph or other device to differentiate $SO_2$ from other sulfur compounds such as hydrogen sulfide or carbon disulfide.

SUMMARY OF THE INVENTION

The present invention avoids the disadvantages of the prior instruments by utilizing the fluorescence property of $SO_2$. Operating solely from a supply of electrical current, the invention requires little attention and provides a continuous record of $SO_2$ concentration. Furthermore it is highly sensitive and specific to $SO_2$, interference coming only from large concentrations (500 or more times the $SO_2$ concentration) of $CS_2$, $NO$, $H_2O$ or $C_2H_4$.

BRIEF DESCRIPTION OF THE DRAWINGS

FIG. 1 is a top plan view, partly sectioned and partly schematic, of an $SO_2$ monitor constructed in accordance with the principles of this invention;

FIG. 2 is sectional view taken on line 2—2 of FIG. 1;

FIG. 3 is an elevational view, partly schematic, of a vapor lamp and filter system adapted for use in the monitor of FIG. 1;

FIG. 4 is a diagram of the response of the monitor as a function of $SO_2$ concentration, the excitation being provided by a zinc vapor lamp, and showing the effect of water vapor in the $SO_2$-air mixture; and FIG. 5 is a diagram similar to that of FIG. 4, except that the exciting source is a cadmium vapor lamp.

DETAILED DESCRIPTION OF THE INVENTION

The $SO_2$ monitor shown in FIGS. 1 and 2 includes a flow-type fluorescence cell 10 formed from four sections of tube 11–14 joined in cruciform fashion. Tubes 11 and 12 are closed with ultraviolet-transmitting windows 16 and 18. The remaining tubes 13 and 14 are closed with plates 17 and 19. A gas inlet tube 20 and an outlet tube 22 (FIG. 2) are secured in openings provided in the centers of the top and bottom surfaces, respectively, of the fluorescence cell 10. Tubes 11–14, 20, 22 and plates 17, 19 are constructed from an $SO_2$-resistant material such as Monel or stainless steel. Window 16 is transparent to ultraviolet in the region from about 2100 to 2300 A. and may comprise a pure quartz such as Suprasil. Window 18 is transparent in the region from about 2400 to 4200 A. and preferably blocks all other wavelengths, so as to reject any scattered incident light (in the region from 2100 to 2300 A. and above 4200 A.). A Corning 5840 glass filter or its equivalent is suitable for this window.

Inlet tube 20 is connected by means of flexible inert tubing (not shown) to a smokestack, air monitoring station or other source of a gaseous mixture 24 containing $SO_2$. A vacuum pump 26 is connected to the outlet tube 22 whereby a sample stream 28 of the gaseous mixture is flowed vertically through the cell 10. The vacuum pump 26 if desired may be replaced by a pressure pump (not shown) connected in the inlet line. In either case, the flow rate is adjusted so that the pressure in the cell 10 is approximately atmospheric pressure.

A source 30 of ultraviolet light having one or more wavelengths in the region from about 2100 to 2300 A. is aligned on the axis of tube 11 so as to project a beam through the sample stream 28. As a result the $SO_2$ in the sample stream fluoresces in the region from about 2400 to 4200 A. A portion 32 of this fluorescence, emerging at right angles to the incident beam, passes through filter window 18 (the filter blocks any scattered incident light) and impinges on an ultraviolet-responsive photomultiplier tube 34 (e.g. an EMI 6256S). A collimating structure such as a honeycomb (not shown) may be placed between window 18 and the photomultiplier tube 34. Tube 34 is supplied with direct current from a suitable supply 36. The photomultiplier output signal is amplified by a linear amplifier 38 and then measured, preferably by means of any suitable recording device or photon counter 40.

It is contemplated that light source 30 may comprise an ultraviolet laser tunable in the region from 2100 to 2300 A. when such devices are developed (it is reasonable to expect a break-through in this area). In any event the source 30 at present preferably comprises a zinc or cadmium vapor lamp 42 (FIG. 3) preferably having a pair of electrodes 41 and 43 and operating on alternating current. A zinc vapor lamp has an intense resonance line at 2138 A. and a cadmium lamp has one at 2288 A. The radiation from the lamp 42 is collected by any suitable means such as a quartz lens 44 and focussed in the center of the sample stream 28. Rays diverging from the lens are blocked by a diaphragm 45 in order to reduce scattering of the incident light from the interior walls of the fluorescence cell. The converging beam is filtered at 46 to remove any spectral lines lying in the $SO_2$ fluorescence region (2400 to 4200 A.). Otherwise these lines could be scattered in the cell and emerge through window 18. Filter 46 conveniently may comprise a short (e.g. 5 cm.) cell having Suprasil windows 47 and filled with chlorine gas at about atmospheric pressure. It has been found that this arrangement efficently passes wavelengths below about 2500 A. and rejects wavelengths up to about 4000 A, thereby filtering the objectionable zinc or cadmium lines. Alternatively filter 46 may consist of an interference filter which transmits the Zn 2138 A. or Cd 2288 A. line and blocks all other wavelengths.

FIGS. 4 and 5 illustrate the response of the monitor of FIG. 1 to various concentrations of $SO_2$ in the gaseous mixture 24 entering the fluorescence cell. Using a zinc lamp (FIG. 4) the concentration is linear from about 0.1 to 500 ppm of $SO_2$ and is negligibly affected by the water vapor content of the mixture. The latter is shown by the small difference between the curves obtained for dry and water-vapor-saturated mixtures. FIG. 5 shows that the response with a cadmium vapor lamp is linear over an unexpectedly wide range, from about 0.1 to 1600 ppm. However now the $SO_2$ signal is moderately affected by the presence of water vapor. It has been found that the signal decreases linearly with the percent increase of water vapor in the mixture. At 2 percent water vapor content (the saturation point at 22° C.), the signal decreases by 25 percent. Hence it is necessary to dry the incoming $SO_2$-air mixture 24 by means of a conventional gas dryer (not shown), or to measure the water vapor content of the mixture 24 and increase the $SO_2$ readings by about 0.125 times the percent of water vapor.

The fluorescence signal is substantially unaffected by many of the other common air pollutants, including ozone, hydrogen sulfide, nitrogen dioxide, carbon dioxide, carbon monoxide and hydrogen. It is negligibly affected by large amounts of methane in the input mixture. An interfering signal is obtained from large concentrations of carbon disulfide and nitrogen oxide (500 times the $SO_2$ concentration) and of ethylene (4000 times the $SO_2$ concentration).

It will be obvious to those skilled in the art that the monitor illustrated in FIGS. 1–3 may be modified in various ways. For example, plate 17 opposite the input window 16 may be replaced by a similar window to permit monitoring of the incident beam. Thus it is intended that the invention cover all modifications falling within the scope of the following claims.

I claim:

1. An $SO_2$ pollution monitor comprising:
   a flow-type fluorescence cell;
   means for flowing a sample stream of air, smokestack gas or the like whose $SO_2$ concentration is to be monitored through said cell;
   means for irradiating said sample stream in said cell with a beam of ultraviolet in the region from about 2100 to 2300 A. whereby said $SO_2$ in said sample stream fluoresces in the region from about 2400 to 4200 A. with an intensity that varies substantially linearly with $SO_2$ concentrations over a wide range of values; and
   means for measuring said $SO_2$ fluorescence intensity at right angles to said irradiating beam, said measuring means being linearly calibrated in terms of $SO_2$ concentration over said range.

2. An $SO_2$ pollution monitor comprising:
   a flow-type ultraviolet fluorescence cell;
   means for flowing a sample stream of air, smokestack gas or the like whose $SO_2$ concentration is to be monitored through said cell;
   means for irradiating said sample stream in said cell with a beam of ultraviolet in the region of about 2138 A. whereby said $SO_2$ in said sample stream fluoresces in the region from about 2400 to 4200 A. with an intensity that varies substantially linearly with $SO_2$ concentrations from about 0.1 to 500 ppm, said fluorescence intensity being negligibly dependent on the water vapor content of said sample stream; and
   means for measuring said $SO_2$ fluorescence intensity at right angles to said irradiating beam, said measuring means being linearly calibrated in terms of $SO_2$ concentration from about 0.1 to 500 ppm.

3. A monitor as set forth in claim 2, wherein said irradiating means comprises a zinc vapor discharge lamp operating on alternating current and means for focussing an image of the discharge thereof in said sample stream in said cell.

4. A monitor as set forth in claim 3 and further including filter means disposed between said lamp and said cell for passing wavelengths in the region below about 2500 A. and for rejecting longer wavelengths.

5. A monitor as set forth in claim 2 and further including filter means disposed before said fluorescence intensity measuring means for passing wavelengths in the region from about 2400 to 4200 A. and for rejecting substantially all other wavelengths.

6. An $SO_2$ pollution monitor comprising:
   a flow-type ultraviolet fluorescence cell;
   means for flowing a sample stream of air, smokestack gas or the like whose $SO_2$ concentration is to be monitored through said cell;
   means for irradiating said sample stream in said cell with a beam of ultraviolet in the region of about 2288 A. whereby said $SO_2$ in said sample stream fluoresces in the region from about 2400 to 4200 A. with an intensity that varies substantially linearly with $SO_2$ concentrations from about 0.1 to 1600 ppm, said fluorescence intensity being dependent to a limited extent on the water vapor content of said sample stream in said cell; and
   means for measuring said $SO_2$ fluorescence intensity at right angles to said irradiating beam, said measuring means being linearly calibrated in terms of $SO_2$ concentration from about 0.1 to 1600 ppm whereby readings therefrom may be corrected according to the amount of water vapor in said sample stream.

7. A monitor as set forth in claim 6, wherein said irradiating means comprises a cadmium vapor discharge lamp operating on alternating current and means for focussing an image of the discharge thereof in said sample stream in said cell.

8. A monitor as set forth in claim 7 and further including filter means disposed between said lamp and said cell for passing wavelengths in the region below about 2500 A. and for rejecting longer wavelengths.

9. A monitor as set forth in claim 6 and further including filter means disposed before said fluorescence intensity measuring means for passing wavelengths in the region from about 2400 to 4200 A and for rejecting substantially all other wavelengths.

10. A monitor as set forth in claim 6 wherein said measuring means comprises a photomultiplier tube connected to a recorder or a counter.

* * * * *